Dec. 8, 1970 R. SCHULTEN 3,545,076

PROCESS OF FORMING CONTACTS ON ELECTRICAL PARTS, PARTICULARLY SILICON SEMICONDUCTORS

Filed Aug. 22, 1967

INVENTOR
Reinhard SCHULTEN

By Michael S. Striker
Attorney

United States Patent Office 3,545,076

Patented Dec. 8, 1970

3,545,076

PROCESS OF FORMING CONTACTS ON ELECTRICAL PARTS, PARTICULARLY SILICON SEMICONDUCTORS

Reinhard Schulten, Schorndorf, Germany, assignor to Robert Bosch GmbH, Stuttgart, Germany Filed Aug. 22, 1967, Ser. No. 662,476
Int. Cl. B01j *17/00;* H01l *5/00*
U.S. Cl. 29—578 3 Claims

ABSTRACT OF THE DISCLOSURE

Contacts of defined configuration are formed on an electrical part which essentially consists of silicon and has a top surface of silicon dioxide by a combination of the following steps:

(a) A photolacquer coating is applied to the part above the silicon dioxide layer;

(b) The intended contact areas are covered;

(c) The photolacquer coating is exposed and subsequently subjected to the action of a photographic developer, thereby dissolving the unexposed portions of the photolacquer and baring the silicon dioxide layer and the said contact areas;

(d) The surface of said part is etched with an etching agent suited to remove the bared silicon dioxide portions while leaving the developed portions of the photolacquer portion in contact;

(e) The remaining developed portions of the photolacquer coating are dissolving with the photolacqued solvent;

(f) A layer of a silicide forming metal is applied over all of the surface of the said part;

(g) The metal layer is subjected to a modifying treatment by tempering so as to partially embed it in and alloy it with the silicon in the surface of the said electrical part, thereby forming an acid insoluble silicide at said contact area; and (h) The metal layer is then removed from the remaining unmodified portions of the silicon dioxide layer by treatment with a solvent for the metal.

The process is particularly applicable to a silicon semiconductor where the metal applied is a nickel layer.

Preferably another nickel layer is applied on top of the tempered nickel layer to form the the contacts proper of the semiconductor.

BACKGROUND OF THE INVENTION

It has been proposed to form contacts for instance on semiconductors that are covered with an oxide coating in the following manner:

A photolacquer coating is applied to the oxide coating which then is covered with a photomask and is subjected to exposure and treated with a photographic developer so that the photolacquer is stripped at the covered portions. The photolacquer remains intact at the portions that have not been dissolved by the treatment with the developer. It there then serves as a photolacquer mask which subsequently protects the oxide coating against an etching agent applied in order to remove the remaining portions of the oxide coating from the contact areas. The exposed portions of the semiconductor surface are then covered with a metal layer which may be adhered by suitable treatment.

In this type of process, the remaining parts of the photolacquer mask on top of the oxide coating were subjected to stripping before the deposition of the metal coating by evaporation was carried out. Subsequently, those parts of the evaporated metal which had deposited on the remaining parts of the oxide coating were etched away by a second photolithographic process which was carried out in the same way as the first photolithographic process. For the exposure in the second instance there was used a photomask which was complementary to the first photomask. After stripping of the second photolacquer mask and subsequent tempering, contact electrodes which were solderable were applied by a chemical plating process to the remaining metal layers at the contact areas.

A good contact formation was obtained in this process. However there were involved many different process steps particularly in view of the double photolithographic process. This process therefore was rather expensive and cumbersome. A description of this type of process is found in the book by R. M. Warner "Integrated Circuits, Design Principles and Fabrication" (1965), p. 323, etc.

SUMMARY OF THE INVENTION

It is therefore an object of the invention to simplify the prior art proceeding. It is particularly an object to avoid a second photolithographic process following the etching of the silicon dioxide coating and dissolution of the first photolacquer mask, and prior to application of the nickel or similar metal layer.

These and other objects as will appear from the specification are accomplished by a combination of the following steps:

(a) A photolacquer coating is applied to the part above the silicon dioxide layer;

(b) The intended contact areas are covered;

(c) The photolacquer coating is exposed and subsequently subjected to the action of a photographic developer, thereby dissolving the unexposed portions of the photolacquer and baring the silicon dioxide layer and the said contact areas;

(d) The surface of said part is etched with an etching agent suited to remove the bared silicon dioxide portions while leaving the developed portions of the photolacquer portion in contact;

(e) The remaining developed portions of the photolacquer coating are dissolved with the photolacquer solvent;

(f) A layer of a silicide forming metal is applied over all of the surface of the said part;

(g) The metal layer is subjected to a modifying treatment by tempering so as to partially embed it and alloy it with the silicon in the surface of the said electrical part, thereby forming an acid insoluble silicide at said contact areas; and (h) The metal layer is then removed from the remaining unmodified portions of the silicon dioxide layer by treatment with a solvent for the metal.

The process is particularly applicable to a silicon semiconductor where the metal applied is a nickel layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The drawing shows a silicon planar semiconductor in cross section and in the several figures illustrates the sequence of process step in an embodiment of the invention.

DESCRIPTION OF THE PREFERRED EMBODIMENTS

Figures 1, 2, 3, 4, 5, 6:
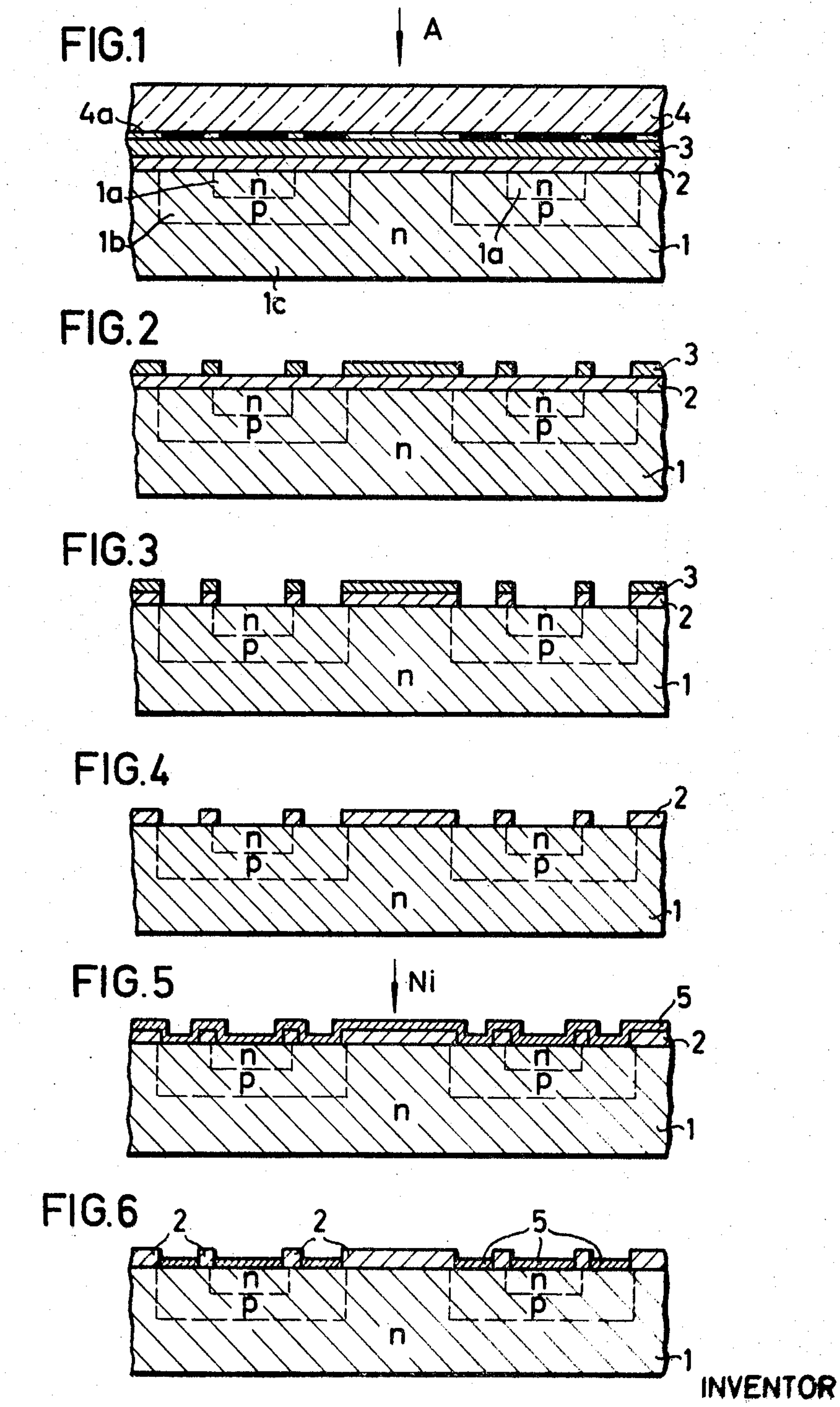
FIG. 1 shows the silicon wafer after application of the silicon dioxide coating, the photoresist coating and the photomask.
FIG. 2 shows the wafer after treatment with the photographic developer.
FIG. 3 shows the wafer after treatment with the etching solution.
FIG. 4 shows the wafer after treatment with hot sulfuric acid.
FIG. 5 shows the wafer after application of the nickel deposit.
FIG. 6 shows the wafer after tempering and subsequent acid treatment.

With reference to the drawing 1 indicates a silicon wafer which as conventional forms part of the silicon planar transistor and consists of an emissive zone, *1a*, a base zone *1b* and a collector zone *1c*, the different zones forming an n-p-n sequence of zones. As appears, the silicon wafer is provided with a coating 2 of silicon dioxide. To the silicon dioxide coating 2 there is then applied a photoresist coating 3. The wafer is then covered with a photomask 4. The photomask 4 is provided at its underside with a photographic emulsion coating *4a* which has transparent or black areas of the shape of the areas of the silicon wafer where the contacts are to be formed in the base and emissive surface portions of the semiconductor body.

The silicon wafer is then radiated with ultraviolet light as indicated by the arrow A in FIG. 1. The photoresist as a result is exposed in the areas of the wafer where the contacts are to be formed or in the areas where no contacts are to be formed. The wafer is thereafter treated with a photographic developer which will dissolve the photoresist coating 3 at the exposed or at the unexposed areas as indicated in FIG. 2. In this manner, a photoresist pattern is formed on top of the silicon dioxide coating on all areas where no contacts are to be formed (FIG. 2).

The wafer is then subjected to thorough washing and drying and is etched with an aqueous hydrofluoric acid solution which has been buffered with ammonium fluoride ($NH_4F$). The photoresist pattern is not attacked by this etching solution and therefore remains intact. However, the silicon dioxide coating 2 is being etched away at the areas which have been freed from the photoresist coating and where the contacts are intended to be placed. In these areas the surface of the silicon transistor body is now open to the outside as shown in FIG. 3.

The remaining photoresist pattern which is still present on the portions of the silicon dioxide coating 2 which have not been attacked by the etching solution is then removed by dipping the silicon wafer into hot sulfuric acid or into an organic solvent. This is indicated in FIG. 4.

The wafer is then again thoroughly washed and dried. Thereafter a deposit of nickel is formed by evaporation in a high vacuum on the top surface of the wafer as indicated in FIG. 5.

The thus coated wafer is then subjected to tempering in a hydrogen gas atmosphere at a temperature exceeding 600° C. The areas of the nickel layer 5 which have been formed on the areas of the silicon wafer that have been freed from the silicon dioxide coating are thus fused with a thin surface portion of the silicon wafer 1. This results in the formation of nickel silicides which are insoluble in an acid medium. On the other hand, the nickel that is present on top of the silicon dioxide pattern 2 remains untransformed in the tempering process. This part of the nickel layer can therefore be easily removed by an acid that acts as a solvent for nickel, for instance nitric acid or a mixture of hydrochloric acid and hydrogen peroxide. The transistor after this operation is shown in FIG. 6. As a result there are obtained nickel layers on the silicon wafer 1 of geometrically defined configuration.

The tempered nickel layer 5 is finally subjected to a slight etching by dipping the silicon wafer into an aqueous hydrofluoric acid solution that has been buffered by ammonium fluoride to a pH value between 4 and 5. Subsequently, solderable nickel contact electrodes are deposited on the etched nickel layer 5 by reduction of nickel chloride ($NiCl_2$) with sodium hypophosphite ($NaH_2PO_2$).

The invention is not limited to the embodiment shown in the drawing and described above. Its essence can be applied to any type of active or passive structural element including resistances and diodes provided the parts have been supplied with a silicon dioxide coating prior to the contact formation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by letters Patent is set forth in the appended claims.

I claim:

1. A process of forming contacts of defined configuration on an electrical part that essentially consists of silicon and has a top surface of silicon dioxide, the said process comprising in combination the following steps:

(a) applying a photolacquer coating to the said part above the silicon dioxide layer;

(b) covering the intended contact areas;

(c) exposing and subsequently subjecting the photolacquer coating to the action of a photographic developer, thereby dissolving the unexposed portions of the photolacquer and baring the silicon dioxide layer at the said contact areas;

(d) etching the said part with an etching agent adapted to remove the bared silicon dioxide portions while leaving the developed portions of the photolacquer coating intact;

(e) dissolving the remaining developed portions of the photolacquer coating with a photolacquer solvent;

(f) applying a layer of nickel over all of the surface of said part;

(g) subjecting the nickel layer to a modifying treatment by tempering so as to partially embed it into and alloy it with the silicon in the surface of said electrical part, thereby forming acid insoluble nickel silicide portions at said contact areas; and (h) removing the unmodified portions of the nickel from the remaining portions of the silicon dioxide layer by treatment with a mixture of hydrogen chloride and hydrogen peroxide.

2. The process of forming contacts of defined configuration on a silicon semiconductor body provided with a top surface of silicon dioxide, the said process comprising in combination the following steps:

(a) applying a photolacquer coating to the said semiconductor above the silicon dioxide layer;

(b) covering the intended contact areas with a photomask having a sensitive photographic emulsion at its underside outside the said contact areas;

(c) exposing and subsequently subjecting the photolacquer coating to the action of a photographic developer, thereby dissolving the unexposed portions of the photolacquer and baring the silicon dioxide layer at the said contact areas;

(d) etching the semiconductor with an aqueous solution of hydrogen fluoride buffered with ammonium fluoride to remove the bared silicon dioxide portions while leaving the developed portions of the photolacquer coating intact;

(e) dissolving the remaining developed portions of the photolacquer coating with a photolacquer solvent;

(f) applying a nickel layer over all of the surface of the said part through evaporation in a high vacuum;

(g) subjecting the nickel layer to a tempering treatment at a temperature above 600° C. so as to partially embed it in and alloy it with the silicon in the surface of the semiconductor body, thereby forming an acid insoluble silicide at said contact areas;

(h) removing the unmodified portions of the nickel layer from the remaining portions of the silicon dioxide layer by treatment with an acid solvent for the metal;

(i) subjecting the nickel layer remaining in the contact areas to a slight etching with an aqueous hydrogen fluoride solution buffered by sodium fluoride to a pH between 4 and 5; and (j) subsequently applying another nickel layer on top of the etched nickel layer by reduction of nickel chloride with sodium hypophosphite, the said second nickel layer forming the contact electrode of the semiconductor.

3. A process of forming contacts of defined configuration on an electrical part that essentially consists of silicon and has a top surface of silicon dioxide, the said process comprising in cobination the following steps:

(a) applying a photolacquer coating to the said part above the silicon dioxide layer;

(b) covering the intended contact areas;

(c) exposing and subsequently subjecting the photolacquer coating to the action of a photographic developer, thereby dissolving the unexposed portions of the photolacquer and baring the silicon dioxide layer at the said contact areas;

(d) etching the said part with an etching agent adapted to removed the bared silicon dioxide portions while leaving the developed portions of the photolacquer coating intact;

(e) dissolving the remaining developed portions of the photolacquer coating with a photolacquer solvent;

(f) applying a layer of nickel over all of the surface of said part;

(g) subjecting the nickel layer to a modifying treatment by tempering so as to partially embed it into and alloy it with the silicon in the surface of said electrical part, thereby forming acid insoluble nickel silicide portions at said contact areas;

(h) removing the unmodified portions of the nickel from the remaining portions of the silicon dioxide layer by treatment with a solvent for the nickel;

(i) subjecting the nickel silicide portions at said contact areas to a slight etching with an aqeous hydrofluoric acid solution buffered by ammonium fluoride to a pH between 4 and 5; and (j) applying to said thus etched nickel silicide portions nickel as contact material by reduction of nickel chloride with sodium hypophosphite.

References Cited

UNITED STATES PATENTS

| | | | |
|---|---|---|---|
| 3,274,670 | 9/1966 | Cepselter | 29—578 |
| 3,281,915 | 11/1966 | Schramm | 29—578 |
| 3,328,216 | 6/1967 | Brown et al. | 29—578 |
| 3,362,851 | 1/1968 | Dunster | 29—589 |

JOHN F. CAMPBELL, Primary Examiner

W. TUPMAN, Assistant Examiner

U.S. Cl. X.R.

29—590; 117—212; 96—36.2